(12) United States Patent
Antonello et al.

(10) Patent No.: US 7,219,070 B2
(45) Date of Patent: May 15, 2007

(54) METHODS AND APPARATUS FOR PRESENTING OFFERS TO QUALIFIED CONSUMERS

(75) Inventors: Christopher Antonello, Raleigh, NC (US); Kevin James Brimhall, Raleigh, NC (US); Deborah Kay McLennan, Leawood, KS (US); Julia Wallace Curtis, Raleigh, NC (US); Robert Peter Noble, Wake Forest, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 646 days.

(21) Appl. No.: 09/682,851

(22) Filed: Oct. 24, 2001

(65) Prior Publication Data

US 2003/0078785 A1    Apr. 24, 2003

(51) Int. Cl.
    *G06F 17/60*    (2006.01)
(52) U.S. Cl. .............................. 705/14; 705/1; 705/26
(58) Field of Classification Search .................... 705/1, 705/14, 26
    See application file for complete search history.

(56) References Cited

U.S. PATENT DOCUMENTS

| | | | |
|---|---|---|---|
| 6,026,370 | A | 2/2000 | Jermyn |
| 6,321,210 | B1 | 11/2001 | O'Brien et al. |
| 6,370,578 | B2 * | 4/2002 | Revashetti et al. ......... 709/224 |
| 6,766,301 | B1 | 7/2004 | Daniel et al. |
| 2002/0002485 | A1 | 1/2002 | O'Brien et al. |
| 2002/0032597 | A1 | 3/2002 | Chanos |
| 2002/0046099 | A1 | 4/2002 | Frengut et al. |
| 2002/0052782 | A1 * | 5/2002 | Landesmann ................ 705/14 |
| 2002/0161641 | A1 | 10/2002 | Quintan et al. |
| 2002/0174011 | A1 | 11/2002 | Sanchez et al. |
| 2003/0028424 | A1 | 2/2003 | Kampff et al. |
| 2003/0078789 | A1 | 4/2003 | Oren |
| 2003/0139969 | A1 | 7/2003 | Scroggie et al. |
| 2003/0200139 | A1 | 10/2003 | Yan |
| 2004/0024639 | A1 | 2/2004 | Goldman |
| 2004/0117261 | A1 | 6/2004 | Walker et al. |
| 2004/0143491 | A1 | 7/2004 | Steinberg |
| 2004/0220854 | A1 * | 11/2004 | Postrel ........................ 705/14 |
| 2005/0010473 | A1 | 1/2005 | McLaughin |

FOREIGN PATENT DOCUMENTS

GB        001089516 A2 *  9/2000
WO    WO 2004/063951       7/2004

OTHER PUBLICATIONS

Infromation on Price Watch Corporation, 1997-2001.*
Information on HomeGain.com, 1999-2001.*
Infromation on E-Loan, Inc., 1997-2001.*

* cited by examiner

*Primary Examiner*—Naresh Vig
(74) *Attorney, Agent, or Firm*—Priest & Goldstein, PLLC

(57) ABSTRACT

A system which allows identification of a consumer as belonging to a designated category and makes special offers available to consumers who are members of the designated category is described. The system comprises a database of offers accessible through connection by consumer operated computers upon authentication of consumer registration, an offer presentation module for controlling access to the database of offers and a consumer registration module allowing registration of a consumer for access to the database of offers. The consumer registration module allows registration of a consumer upon submission of identifying information provided to the consumer by a party who has identified the consumer as belonging to a designated category and used to identify the consumer as belonging to the designated category.

19 Claims, 19 Drawing Sheets

FIG. 4A

GEhomenow.com

We bring good things to life.

Glossary | Contact Us

Home
About Mortgage Insurance
Homebuyer Resources
Homebuyer Privileges
Lending Partner Locator
GE Cool Links
Technical Hints
WE RESPECT YOUR PRIVACY GE Mortgage Insurance Providing all the benefits of GE...

Purchase of Private Mortgage
Insurance Not Required!

GE's Homebuyer Privileges℠
*Available through Participating Lenders*

When you're in the market for a new home or enhancing your current home, you'll find that your expenses-from paint to major appliances to furniture-quickly add up.

That's why GE has teamed up with major suppliers to create Homebuyer Privileges. When you work with a participating lender to get your mortgage, you'll have access to great savings on moving and home-related products and services!

How to get your *Homebuyer Privileges*

○ Select a participating lender
 -Need to locate a participating lender?
 Use the lending Partner Locator →Check Back
Often For
New Offers!

Current Street Address: 2119 N 14th Ave
City: Dodge City
State: KS
Zip: 67801
Is your home new construction? Yes
E-mail Address: hughdmann@hotmail.com Select a reminder question. You will be prompted with this question in the event you require assistance in remembering your access information.

Reminder Question: What is your favorite pet's name? — 628
Question Answer: Grendel — 630 (go) — 632

Offers subject to change and not available through all lenders or in all states. Purchase of private mortgage insurance not required.

Legal Information | Privacy Policy | Terms and Conditions  1998,1999,2000 General Electric Company

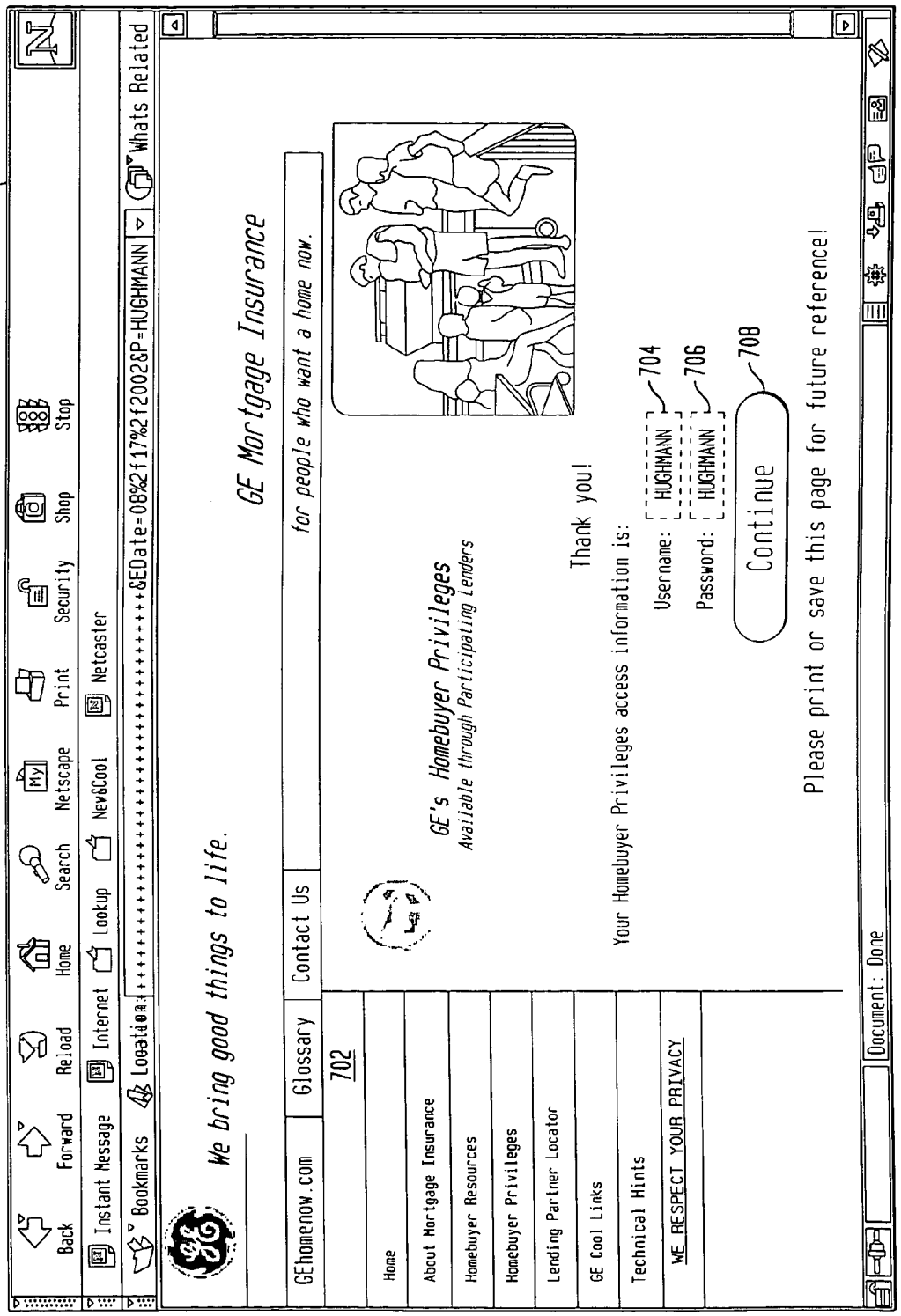

METHODS AND APPARATUS FOR PRESENTING OFFERS TO QUALIFIED CONSUMERS

BACKGROUND OF INVENTION

The present invention relates generally to advantageous methods for marketing of products, offers or the like. More particularly, the invention relates to techniques for identifying consumers who are members of a designated category which has been judged to be a desirable market for a class of products and presenting special offers to consumers who have been identified as members of the designated category.

Many life events and activities, such as high school or college graduation, marriage, childbirth, sending children to college, relocation and the like create a need for products and services. Such events present significant opportunities for marketing efforts directed toward consumers engaging in a particular activity. Relocation of a family, to take a particular example, frequently creates needs for a particular set of products or services. The act of relocating generates requirements for goods and services related to making the move, such as moving and storage services, packing material, truck rental and the like, as well as requirements for goods and services related to taking up the new residence such as insurance, utility services, school registration, furniture, groceries and the like. A relocating family has a set of needs which can be easily anticipated. Because the activities involved in relocation frequently occur in a known sequence and because the time occupied by each activity can be estimated with reasonable reliability, the approximate times at which the family will need particular goods or services can be anticipated. Identifying a relocating person or family therefore provides a significant marketing opportunity to a number of vendors, and the value of the marketing opportunity increases with the certainty with which the prospective consumer is identified as a genuine relocating consumer.

Because a relocating family often spends a considerable sum in arranging a move and purchasing products or services needed after the move, a vendor will frequently be willing to extend special offers to such a family. These offers can be significantly more valuable than those which would be offered to other prospective consumers. However, a particularly lucrative offer advertised generally in an effort to reach relocating consumers might induce prospective consumers to falsely claim that they were relocating, and it is difficult for a vendor to determine whether a consumer who claims to be preparing to engage in a particular activity such as relocating is telling the truth. The vendor cannot inquire too closely into the consumer's personal affairs for fear of alienating the consumer. The vendor cannot reasonably ask for a deposit or credit card guarantee because a consumer is unlikely to part with money or a credit card number unless he or she is actually buying a product or service. In the present state of the art, therefore, a vendor cannot easily prevent offers directed toward a specific category of consumers from being used by persons not in the category.

Moreover, it is often difficult for a vendor to discover that a particular consumer is relocating, particularly early in the relocation process. Many of the actions which identify a consumer as relocating occur shortly before, or after, the consumer has moved to a new residence. For example, a consumer typically enters a change of address order so that the consumer's mail will be properly delivered to the new residence. If a vendor finds out that a consumer has entered a change of address order, the vendor can identify the consumer as being about to change, or having recently changed, addresses. Such an identification allows the vendor to include the consumer in marketing efforts directed toward similar consumers. In most cases, however, the move is imminent or has already occurred by the time a consumer needs to enter a change of address order, and the typical consumer has already arranged for or used many products and services related to a move. For example packing supplies and moving services or truck rental would have already been arranged for or used by the time a consumer has typically entered a change of address order. Companies offering products or services which are typically arranged early in the relocation process do not gain much benefit by identifying relocating consumers as a result of events which occur later in the relocation process.

There exists, therefore, a need for a system which will identify a consumer as engaging in a specific activity identified with a marketing opportunity, using information which the consumer will be willing to provide, and which identifies the consumer early in the process of his or her engaging in the activity.

SUMMARY OF INVENTION

In order to meet this need, one aspect of the present invention provides a system which allows identification of a consumer as belonging to a designated category and providing consumers so identified with offers, comprising a database of offers accessible through connection by consumer operated computers upon authentication of consumer registration, an offer presentation module for controlling access to the database of offers and a consumer registration module allowing registration of a consumer for access to the database of offers. The consumer registration module allows registration of a consumer upon submission of identifying information provided to the consumer by a party who has identified the consumer as belonging to a designated category and used to identify the consumer as belonging to the designated category.

In another aspect, a process is provided of presenting offers to consumers who are members of a designated category, comprising the steps of providing a consumer with an identifier upon verification of the consumer's membership in the designated category by a party providing the identifier, receiving the identifier when presented by the consumer, authenticating the identifier, allowing the consumer to register his or her identity after successful authentication of the identifier, and upon completion of registration, allowing the consumer access to a selection of offers.

A more complete understanding of the invention, as well as further features and advantages of the invention, will be apparent from the following Detailed Description and from the claims which follow below.

BRIEF DESCRIPTION OF DRAWINGS

FIGS. 6A and 6B illustrate aspects of an initial registration form according to an aspect of the present invention;

FIG. 7 illustrates an initial web page displayed after registration submission according to an aspect of the present invention;

DETAILED DESCRIPTION

Figure 1:
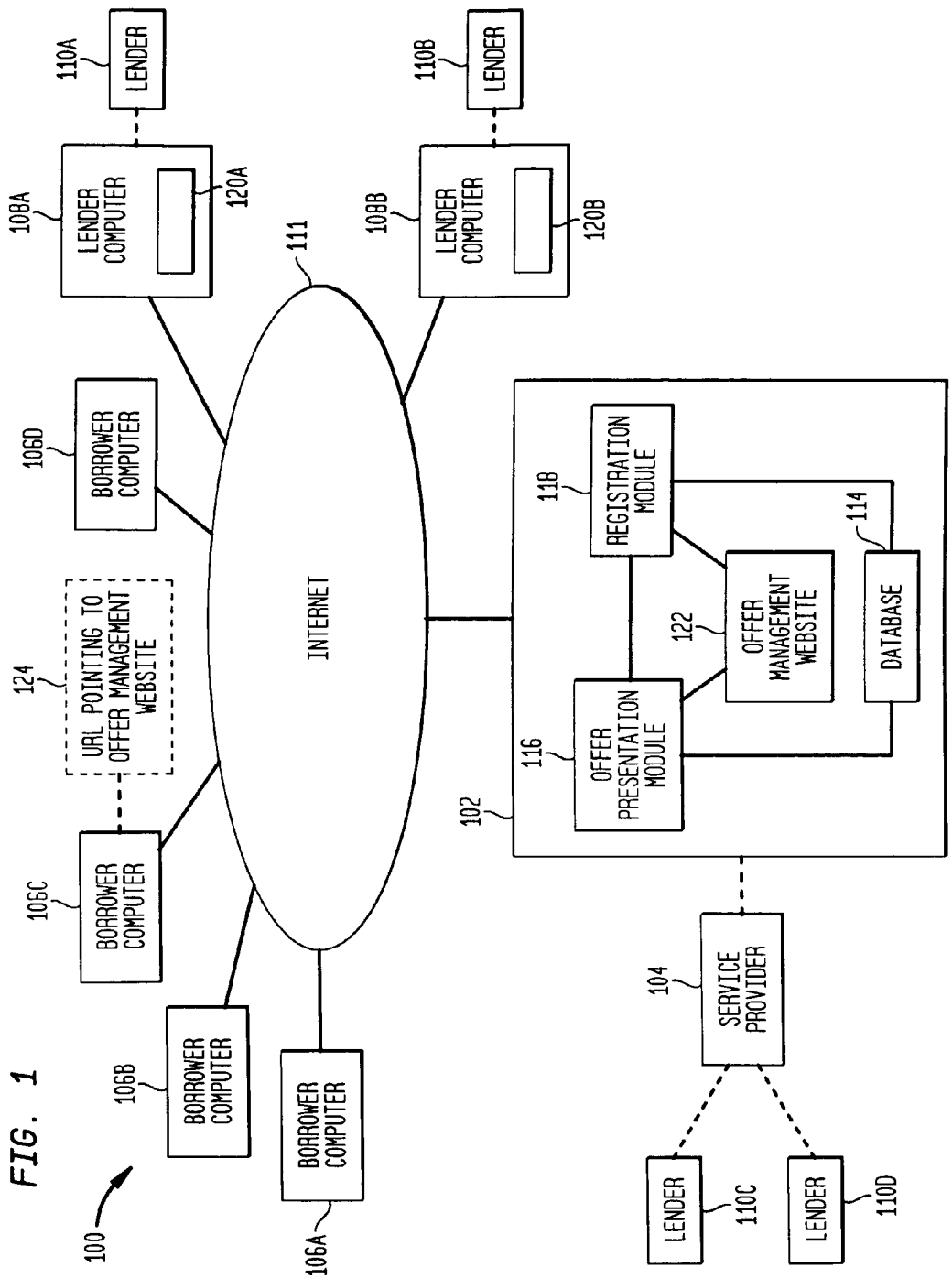
FIG. 1 illustrates a consumer identification and offer presentation system according to an aspect of the present invention.

FIG. 1 illustrates a consumer identification and offer presentation system 100 according to an aspect of the present invention. The system 100 provides a way to identify a consumer as belonging to a designated category, in this case persons who have applied for or made serious inquiries about home loans with a particular lender, the lender being a member of a group of lenders who have subscribed to services provided by the system 100, and to present offers to that consumer. Identifying consumers in connection with inquiries about a home loan provides significant advantages. Consumers who have applied for home loans have in most cases already entered into purchase contracts for the real estate connected with the loan. Customers who have made serious inquiries about home loans but have not yet applied for the loan may also have entered into a purchase contract or may be seriously engaged in searching for a suitable home. It can be expected that a large proportion of such consumers are true relocating consumers. Moreover, consumers typically apply for or inquire about home loans early in the relocation process. Therefore, identification of a consumer as soon as he or she applies for or inquires about a home loan allows for marketing of products and services tailored to all stages of the relocation process. The system 100 illustrates an embodiment of the present invention which is oriented toward the identification, and directing of offers to, borrowers who have applied for home loans or who have made serious inquiries with a participating lender such that the lender regards the borrower as a serious prospect for a loan. The term "borrower" as used herein will include both persons who have actually applied for a loan and persons who have made inquiries with a participating lender and are eligible for use of the system 100.

It will be recognized that the system 100 may easily be adapted to limit participation to borrowers who have actually applied for a loan. It will further be recognized that a system similar to the system 100 may easily be designed to allow for consumers belonging to any desired category to be identified, for example, persons who have reserved a hall for a wedding, persons who are seniors in college, or any category which it may be desirable to designate in order to direct marketing of products or services to members of that category in a targeted manner.

The system 100 includes a server 102 operated by a service provider 104. The server 102 communicates with a plurality of borrower operated computers, for example the computers 106A–106D, and may also communicate with various lender computers 108A and 108B maintained by or providing services to lenders 110A and 110B. Communication with the server 102, the remote borrower computers 106A–106D and the lender computers 108A and 108B is preferably accomplished through a publicly accessible network 111, such as the Internet. The service provider 104 typically has contracts with each of a plurality of lenders, including the lenders 110A and 110B as well as lenders 110C and 110D, who in the present example do not maintain computers having a connection to the server 102. Many more borrowers, borrower computers, lenders and lender computers can be included in the system 100, but for simplicity in illustration and discussion, only four borrower computers, four lenders and two lender computers are shown here.

The server 102 maintains a database 114 of offers and discounts provided by various vendors under contract with the service provider 104, as well as an offer presentation module 116 for controlling access to the offers and a consumer registration module 118 which allows identification and registration of borrowers and maintenance and storage of borrower information. When a borrower applies for or inquires about applying for a mortgage from a lender, the lender may suitably provide the borrower with an identifier and password uniquely identifying that lender. The lender typically also tells the borrower about the system for providing offers and may provide the borrower with instructions for connecting to and registering with the server computer 102. The lender may provide the borrower with the identifier and password and additional information and instructions required for access to the system 100 by one or more of a number of means, such as personal conversation with a loan officer, by providing this information as part of a package of printed material furnished to the borrower, or other suitable means. If desired, the system 100 may be designed so that lenders limit participation to those customers who have actually applied for a loan. Alternatively, the system 100 may be designed so that some lenders limit participation to customers who have applied for a loan and other lenders allow participation to both actual loan applicants and persons judged to be serious prospects. Allowing or disallowing participation by a borrower or prospective borrower is easily achieved by providing or withholding the identifier and password and instructions for connecting to and registering with the server 102.

In this example, borrower A, a customer of the lender 110A, receives the identifier and password from the lender 110A. Borrower A uses his computer 106A to connect to a website 120A hosted on the computer 108A. The website 120A contains a hypertext link to a website 122 hosted on the server 102. The website 122 may suitably be used by both the offer presentation module 116 and the registration module 118 to provide an interface for communicating with a consumer such as borrower A. When linked from the website 120A, the website 122 displays a promotional message from the lender 110A. The website 122 presents borrower A with an initial validation web page which allows him to enter the identifier and password supplied by the lender 110A. Borrower A is then taken to a registration web page in which he is allowed to enter a unique username and password as well as personal information. The website 122 then displays a login web page which allows borrower A to gain access to various offers which are displayed as hypertext links on the login web page by agreement between the provider 104 and the lender 110A.

By clicking on a chosen hypertext link, borrower A can connect to an offer website and display an offer web page which displays offer information. Because the consumers using the system 100 tend to be particularly attractive consumers, the offers provided may advantageously be better for the consumers than typical promotions generally offered. The offer website and offer web page typically contain promotional material identifying the system 100 and welcoming the borrower as a user of the system 100.

The offer information may take the form of a description of an offer or discount, an order form or an online coupon. If desired, any number of alternative formats may be used. Each offer website may, depending on arrangements between the service provider 104 and the vendor making the offer, be hosted on the server 102 or another server maintained by the provider 104, or alternatively a server maintained by the vendor or by another party providing hosting services to the vendor.

As borrower A navigates through the various links, the original identifier which borrower A used during registration is retained and included in each link. Whenever borrower A seeks access to an offer, the lender 110A is identified to the vendor originating the offer as the lender who introduced borrower A to the system 100. If desired, the identification of the lender 110A can be used to direct the inclusion of a promotional message from the lender 110A on the offer page. Statistical information indicating how many borrowers referred by each lender accessed each of the various offers can also be maintained and used by the service provider and the various vendors and lenders to make judgments about which offers should be included and how the offers should be presented. Moreover, personal information previously supplied by borrower A is typically also provided to the vendor for use in creating offer materials such as online coupons or coupons for mailing. This information may, with permission from borrower A, be retained by the vendor and used in marketing efforts directed toward borrower A. Use of the system 100 identifies borrower A as a particularly attractive consumer and the collection of information relating to such consumers may be highly advantageous to vendors.

As a further example, borrower C initiates contact with the system 100 by establishing a connection between her computer 106C and the website 122 hosted on the server computer 102. Borrower C has previously been presented with a lender identifier and password by lender 110C. Lender 110C does not maintain a computer having a connection with the server 102, but instead simply provides borrower C with a universal resource locator (URL) 124 directing borrower C to the website 122. The URL 124 provided to borrower C may simply be the normal address of the website 122. Alternatively, however, the URL 124 may be a special URL, which may suitably be provided to the lender 110C by the service provider 104 and which directs Internet browsers to the website 122. The special URL may include a name similar to that of lender 110C. Use of the URL to connect to the website 122 may suitably supply the website 122 with special information and may thereby cause the display on the website 122 of promotional material related to the lender 110C. Upon establishing a connection with the website 122, borrower C registers with and uses the system 100 in the same manner as does borrower A as described above.

Figure 2:
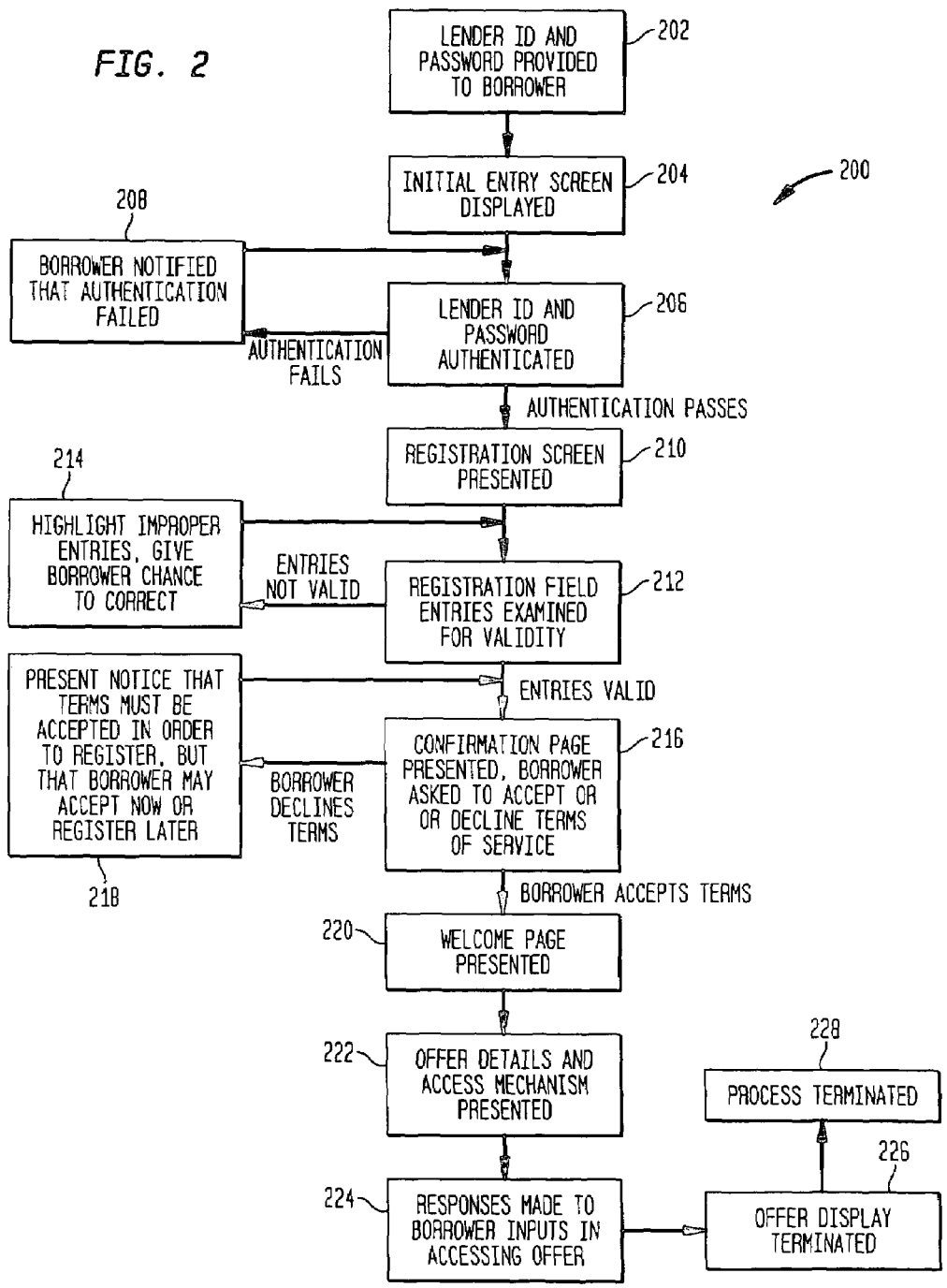
FIG. 2 illustrates process of consumer identification and registration according to an aspect of the present invention.

FIG. 2 illustrates a process 200 of borrower registration and offer selection according to the present invention. The process 200 may advantageously be carried out using a system similar to the system 100 of FIG. 1. At step 202, after a borrower has been judged to be a serious prospect for a home loan, for example because he or she has applied for or inquired about applying for a home mortgage with a lender, a lender identifier and password unique to that lender are provided to the borrower. The borrower is also informed that special offers can be accessed and is given instructions on how to use the identifier and password in order to register and gain access to the offers. The instructions may specify that the borrower connect to the lender's website and select a link found there, or may alternatively specify that the borrower link directly to an initial registration and offer selection website.

At step 204, in response to the borrower's connection to the initial registration and offer selection website, either by navigating from the lender's website or by directly connecting to the initial registration and offer selection website, an initial entry web page is presented allowing the borrower to enter the previously supplied identifier and password. The initial entry web page may suitably include options for registration by new borrowers or for login by already registered borrowers. If the initial entry web page has been reached by navigation from the lender's website, the initial entry web page may suitably include promotional material identifying or chosen by the lender. At step 206, upon entry of the identifier and password by the borrower, the identifier and password are authenticated. If authentication fails, the process proceeds to step 208, the borrower is notified that authentication failed and given an opportunity to reenter the identifier and password, and the process returns to step 206. If authentication passes, the process proceeds to step 210 and a registration web page is presented giving the borrower an opportunity to select a custom username and password and requesting that the borrower supply specified information, such as name, address, telephone, and email address. A set of fields is preferably presented to allow user entries.

At step 212, in response to a borrower entry such as clicking on an icon, the fields entries are examined to confirm that valid entries have been made in all required fields. If proper entries have not been made, the process proceeds to step 214, the fields where correction is required are highlighted and the borrower is given an opportunity to correct the entries. The process then returns to step 212. If proper entries have been made, the process proceeds to step 216 and a confirmation page is presented showing the username and password, as well as a statement of terms which the borrower is asked to accept or decline. In response to the borrower's selection to decline the statement of terms, the process proceeds to step 218 and a notice is displayed that the terms of service must be accepted in order for registration to be completed, but that the borrower is free to accept the terms of service and complete registration or else to reregister at any time. The process then returns to step 216. If the borrower accepts the terms of service, the process proceeds to step 220 and the previously entered information is stored and a welcome page is presented, including the username, password, various selections of choices such as a selection to update the borrower profile, and a selection of available offers with each offer suitably being presented as a hypertext link accompanied by explanatory text.

Next, at step 222, in response to the borrower's selection of an offer, such as clicking on a hypertext link, a connection is made to a server hosting a web page with offer details and one or more mechanisms for taking advantage of the offer, for example linking to a signup or order form, displaying an online coupon for printing, displaying a discount identification code or other desirable ways to take advantage of the offer. In making the connection to the offer, the borrower's identification and the identification code provided to the borrower by the lender are provided to the server hosting the offer web page, in order to allow the collection of statistical information relating to the types of borrowers who obtain access to the various offers, distinguishing borrowers accessing an offer for the first time from borrowers who are accessing the offer for a second or subsequent time, and identifying a borrower accessing an offer as coming from a particular lender. Providing the borrower and lender identification also allows the offer web page, if desired, to display welcoming information directed to the specific borrower or to provide promotional information relating to the lender who originally referred the borrower to the system. At step 224, appropriate actions are taken in response to borrower inputs, such as displaying online forms for information entry and accepting and processing the information provided using these forms, displaying online coupons, or other appropriate actions selected by the borrower. At step 226, in response to a borrower action, for example, closing an Internet browser window used to display the offer information, display of the offer is terminated. Steps 222–226 may be carried out as desired by the borrower. At step 228, in response to a borrower selection such as logout or closing of a browser window used to make the initial connection to the system, the process terminates.

Figure 3:
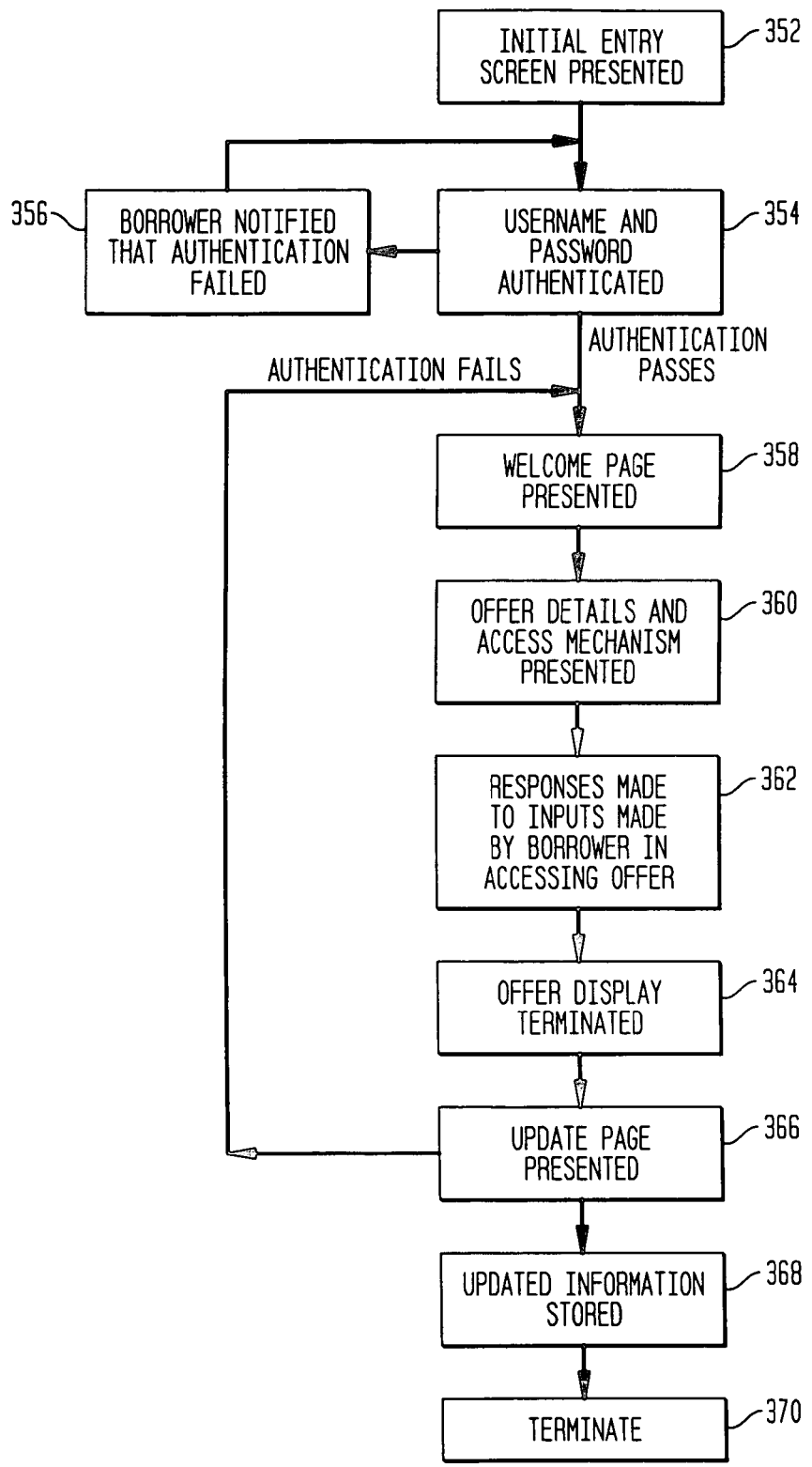
FIG. 3 illustrates a process of consumer login and offer selection according to an aspect of the present invention.

FIG. 3 illustrates a process 350 of login and offer selection according to the present invention. The process 350 is carried out after the initial registration described in connection with FIG. 2 has been completed successfully. At step 352, in response to the borrower's connection to the website previously connected to in step 206 of FIG. 2, an initial entry web page is presented allowing the borrower to enter the borrower identification and password previously chosen at registration. At step 354, upon entry of the borrower identifier and password, the borrower identifier and password are authenticated. If authentication fails, the process proceeds to step 356, the borrower is notified that authentication has failed and is given an opportunity to reenter the borrower identifier and password and the process returns to step 352. If authentication passes, the process proceeds to step 358 and a welcome page is presented, including the username, password, various selections of choices such as a selection to update the borrower profile, and a selection of available offers with each offer suitably being presented as a hypertext link accompanied by explanatory text.

At step 360, in response to the borrower's selection of an offer, such as clicking on a hypertext link associated with the offer, a connection is made to a server hosting a web page with offer details and one or more mechanisms for taking advantage of the offer, for example linking to a signup or order form, displaying an online coupon for printing, displaying a discount identification code or other desirable ways to take advantage of the offer. The server is typically operated by or for a vendor making the offer. In making the connection to the offer, the borrower's identification and the identification code provided to the borrower by the lender are provided to the server hosting the offer web page, as well as personal information relating to the borrower such as the borrower's name and address. By receiving the borrower's identification as well as the identification code provided by the lender, the vendor is able to collect statistical information relating to the types of borrowers who obtain access to the various offers, distinguishing borrowers accessing an offer for the first time from borrowers who are accessing the offer for a second or subsequent time, and identifying a borrower who is accessing an offer as being associated with a particular lender. Identification of the borrower may also be used to insure that the borrower meets predefined conditions which have been previously established in order to control access to offers. These conditions may include, for example, the condition that the borrower has not previously accessed the offer or has accessed only a specified number of times within the previous month, or that only a specified time, such as one year, has passed since the borrower's initial registration with the system 100.

Providing the borrower and lender identification also provides the ability for the offer web page, if desired, to display welcoming information directed to the specific borrower or to provide promotional information relating to the lender who originally referred the borrower to the system. The web page may suitably present information about possible uses of the borrower's personal information. For example, the web page may state that the borrower's personal information will be used in order to mail a coupon which is part of the offer. In addition, the web page may request consent for continued storage of the borrower's personal information and its use for marketing efforts directed toward the borrower.

At step 362, appropriate actions are taken in response to borrower inputs, such as displaying online forms for information entry and accepting and processing the information provided using these forms, displaying online coupons, or other appropriate actions are taken in response to a selection by the borrower. The borrower typically makes such selections in choosing and accepting an offer. Selections may include entering information in a form and submitting the form, choosing to allow or reject the storage and use of the borrower's personal information or responses to other requests and information presented by the web page. At step 364, in response to a borrower action, for example closing an Internet browser window used to display the offer information, display of the offer is terminated. Steps 360–364 may be carried out as needed in response to commands. At step 366, in response to the borrower's selection to update the profile, an update web page is presented containing data fields containing the registration information previously submitted, as well as a submit link which the borrower can click to submit the updated information, and return link which the buyer can click to abort the update process and return to the welcome web page. Some of the data fields may be editable in order to furnish corrected or updated information, while some of the data fields may contain unchangeable information such as the lender identification and password. The borrower is free to edit the editable data fields as desired and click either the submit link or the return link. If the borrower clicks the return link, the process returns to step 358. If the borrower clicks the submit link, the process proceeds to step 368 and the borrower information entered in the data fields is stored. The process then returns to step 358. At step 370, in response to a borrower selection such as logout or closing of a browser window used to make the initial connection to the system, the process terminates.

Figure 4:
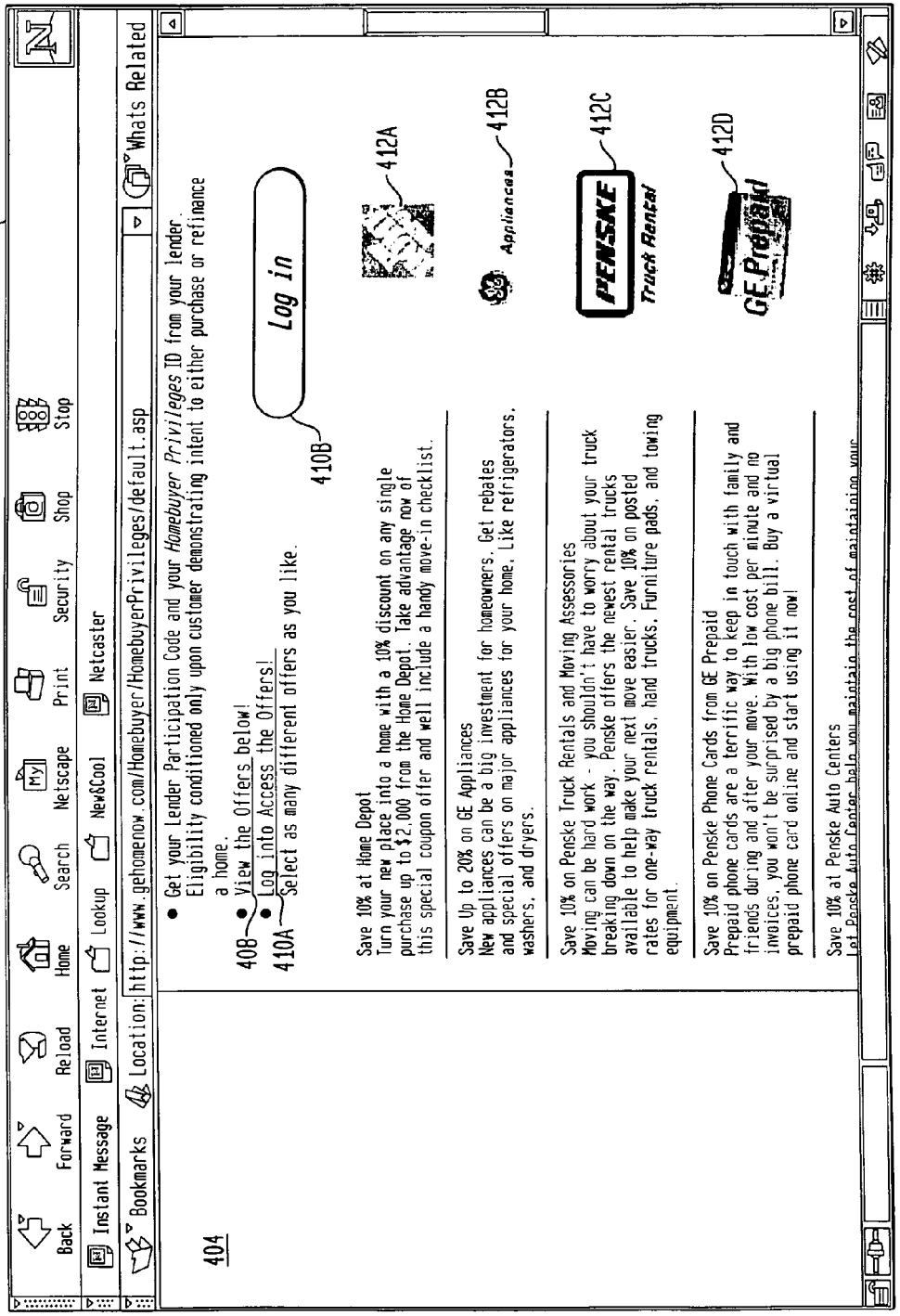
FIGS. 4A and 4B illustrate an initial entry web page according to an aspect of the present invention.

FIG. 4A illustrates an exemplary initial entry web page 400 which may suitably be produced by performing step 204 of the process 200. The entry web page 400 employs an Internet browser 402 to display an Internet web page 404 which may be navigated to by the URL 406. The entire web page 404 is not visible at one time, but desired portions may be displayed by scrolling up and down and additional portions of the web page 404 are illustrated in FIG. 4B.

FIG. 4B illustrates the browser 402 displaying a further portion of the web page 404, including a first hypertext link 408 allowing a user to view available offers, as well as second and third hypertext links 410A and 410B, selection of which connects to another web page which allows the user to perform initial registration or login following a previous registration. FIG. 4B also illustrates descriptions of various available offers, including hypertext links 412A–412D. Clicking on the hypertext links 412A–412D does not provide access to the offers described, but instead connects to the same login web page to which a user may navigate by clicking one of the links 410A or 410B. The web page 404 can be scrolled further down to display additional offer descriptions and links, not illustrated here in order to avoid redundancy.

Figure 5:
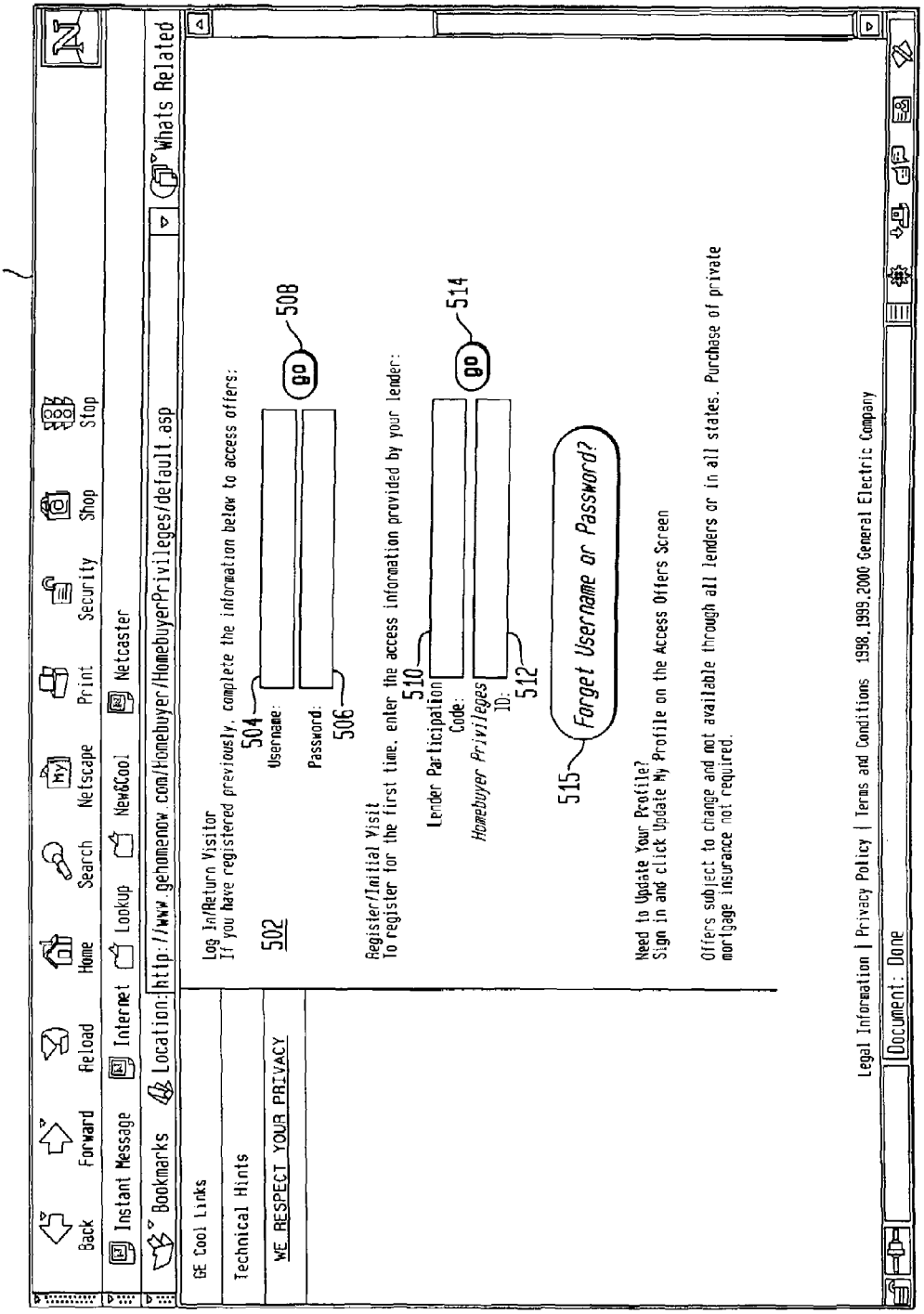
FIG. 5 illustrates an initial registration selection web page according to an aspect of the present invention.

FIG. 5 illustrates the browser 402 displaying a web page 502 for allowing a borrower to choose initial registration or login after initial registration. The web page 502 includes a borrower identification field 504, a borrower password field 506, and a login information submission link 508. The web page 502 further includes a lender identification field 510, a lender password field 512 and a lender information submission link 514. Submitting the proper information in the correct fields and selecting the associated link submits the information for authentication. If the borrower has forgotten his login information, he can click on the forgot username or password link 515 in order to retrieve this information.

Figure 6A:
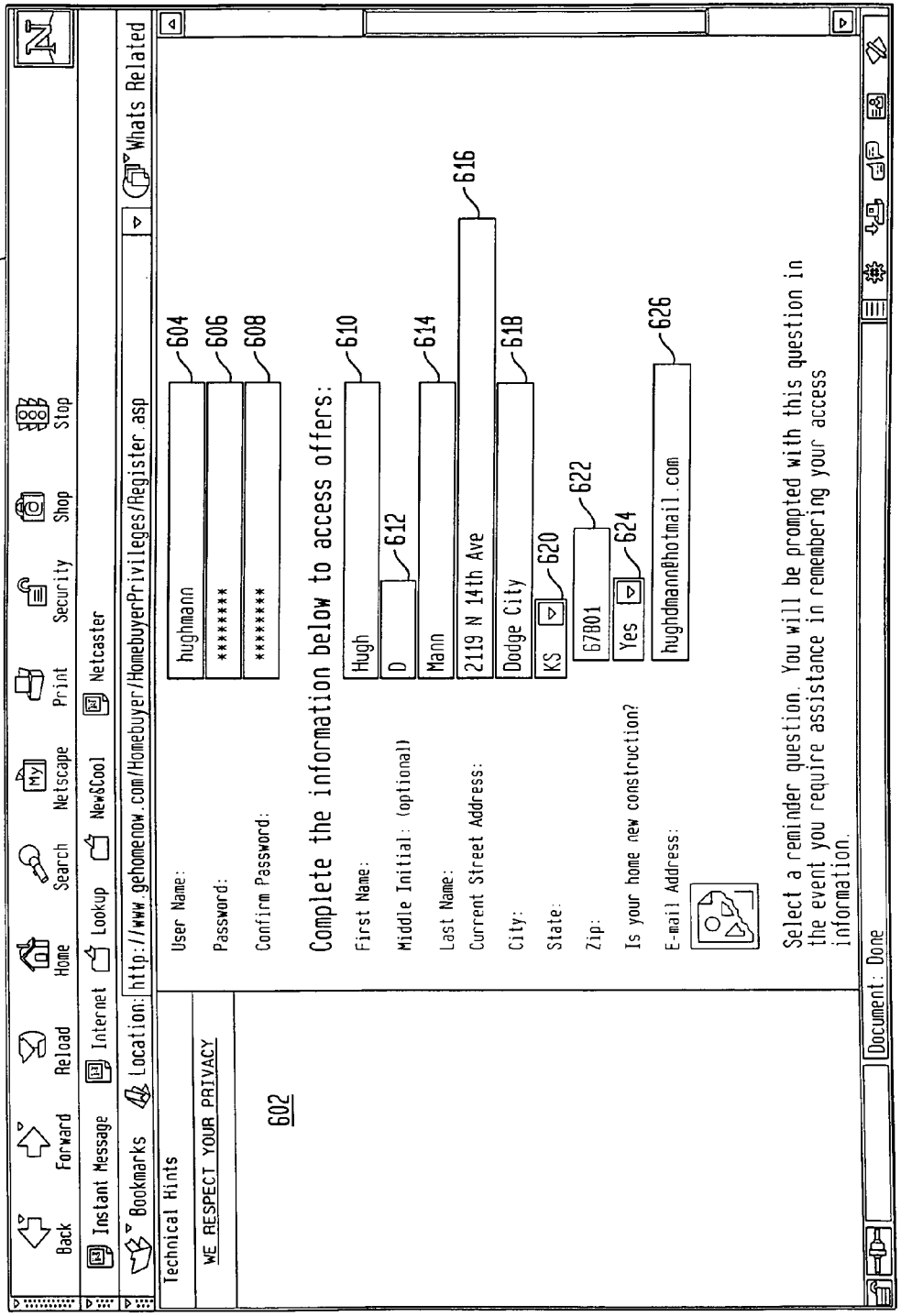

FIG. 6A illustrates the browser 402 displaying a web page 602, reached upon proper submission of lender identification information and an associated lender password. The web page 602 includes data entry fields 604–626 for entering a chosen username and password as well as personal information.

FIG. 6B illustrates the browser 402 displaying the web page 602 after the web page 602 has been scrolled down to reveal additional elements. Data entry fields 616–626 are visible, as well as the additional data entry fields 628 and 630, for entering a password reminder question and answer, respectively. The web page 602 also includes a registration information submission link 632, which can be clicked by the borrower to submit the registration information.

FIG. 7 illustrates the browser 402 displaying a web page 702, after the borrower has submitted registration information by clicking the link 632. The selected username 704 and password 706 are displayed, as well as a continue link 708.

Figure 8A:
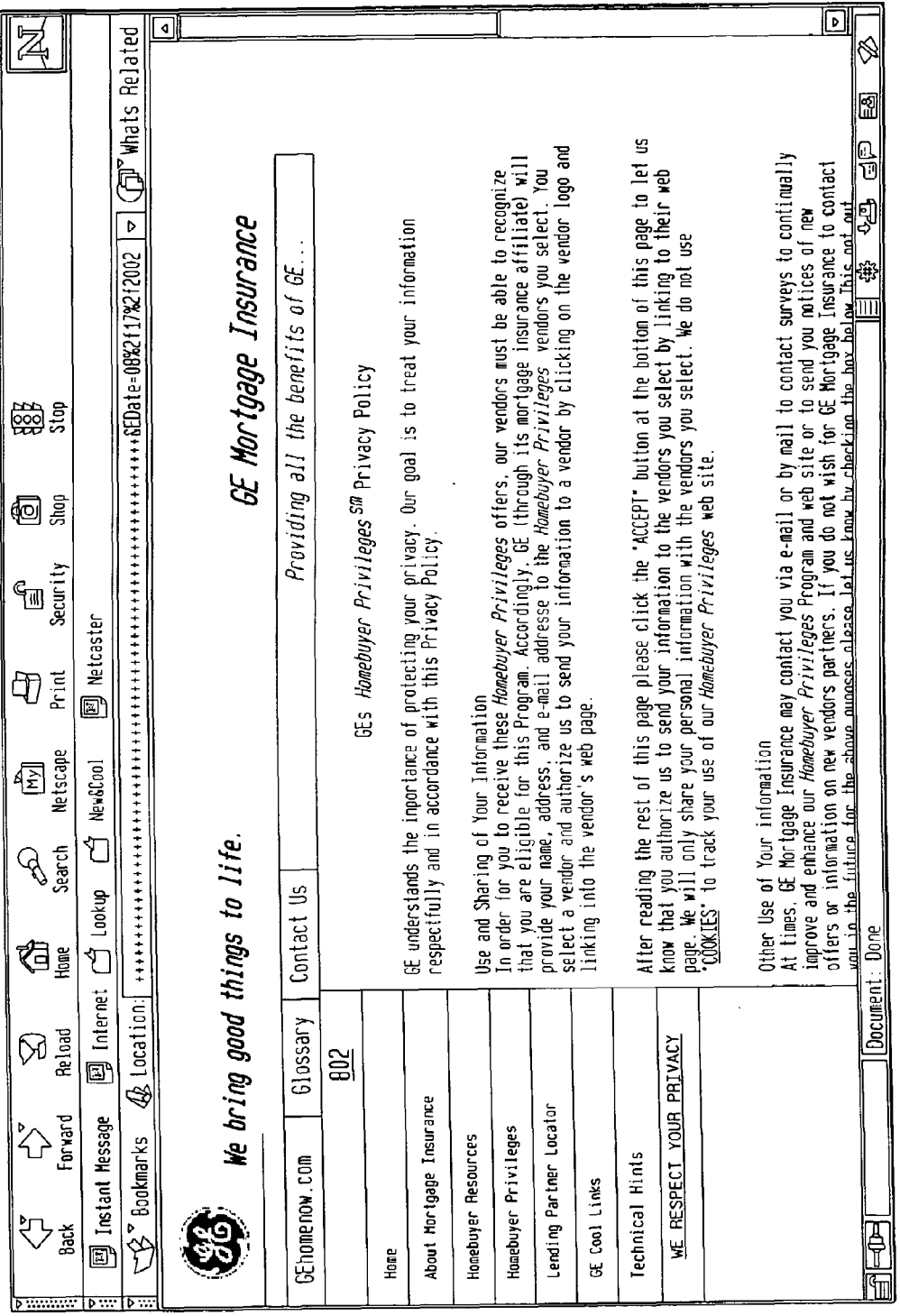
FIGS. 8A and 8B illustrate a web page displaying a privacy policy and a mechanism for accepting or rejecting the privacy policy according to an aspect of the present invention.

FIG. 8A illustrates the browser 402 displaying a web page 802 displayed after the borrower has clicked the continue link 708. The web page 802 includes a privacy policy describing rules and guarantees relating to collection of borrower information and its use in the system. The remainder of the privacy policy, and mechanisms for accepting or rejecting the privacy policy, are illustrated in FIG. 8B and discussed below.

Figure 8B:
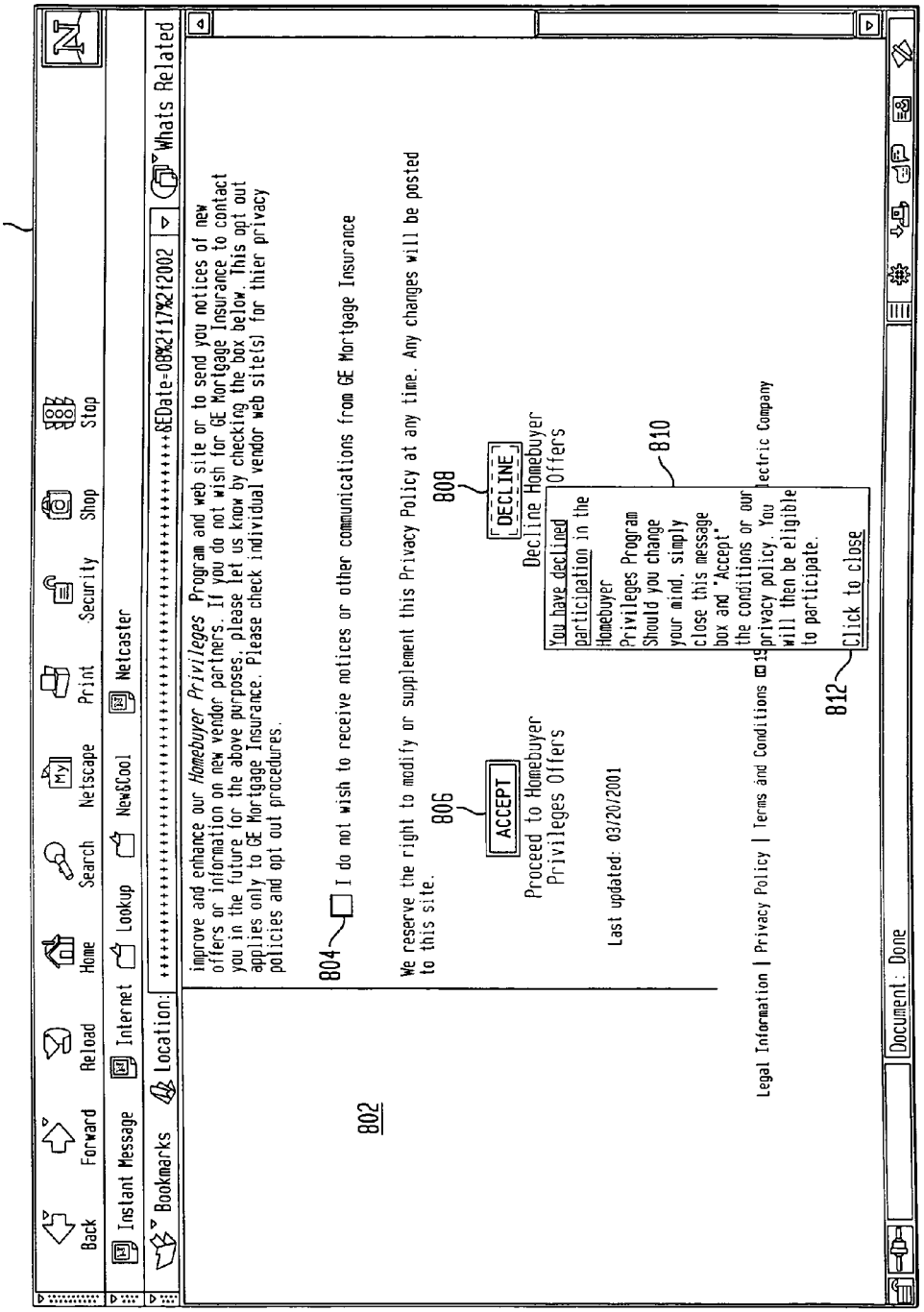

FIG. 8B illustrates the browser 402 displaying the web page 802, which has been scrolled down to reveal the remainder of the privacy policy, as well as a checkbox 804 for declining notices or other communication, as well as an accept link 806 and a decline link 808 for accepting or rejecting the privacy policy. For purposes of illustration, the decline link 808 has been clicked to reveal a message box 810 explaining that the borrower has declined participation in the program by declining the privacy policy, and that the borrower will be eligible to participate if the borrower closes the message box 810 and clicks the accept link 808 to accept the privacy policy. If the borrower clicks the click to close link 812, the message box 810 will disappear and the buyer will be free to accept the privacy policy by clicking the accept link 806.

Figure 9A:
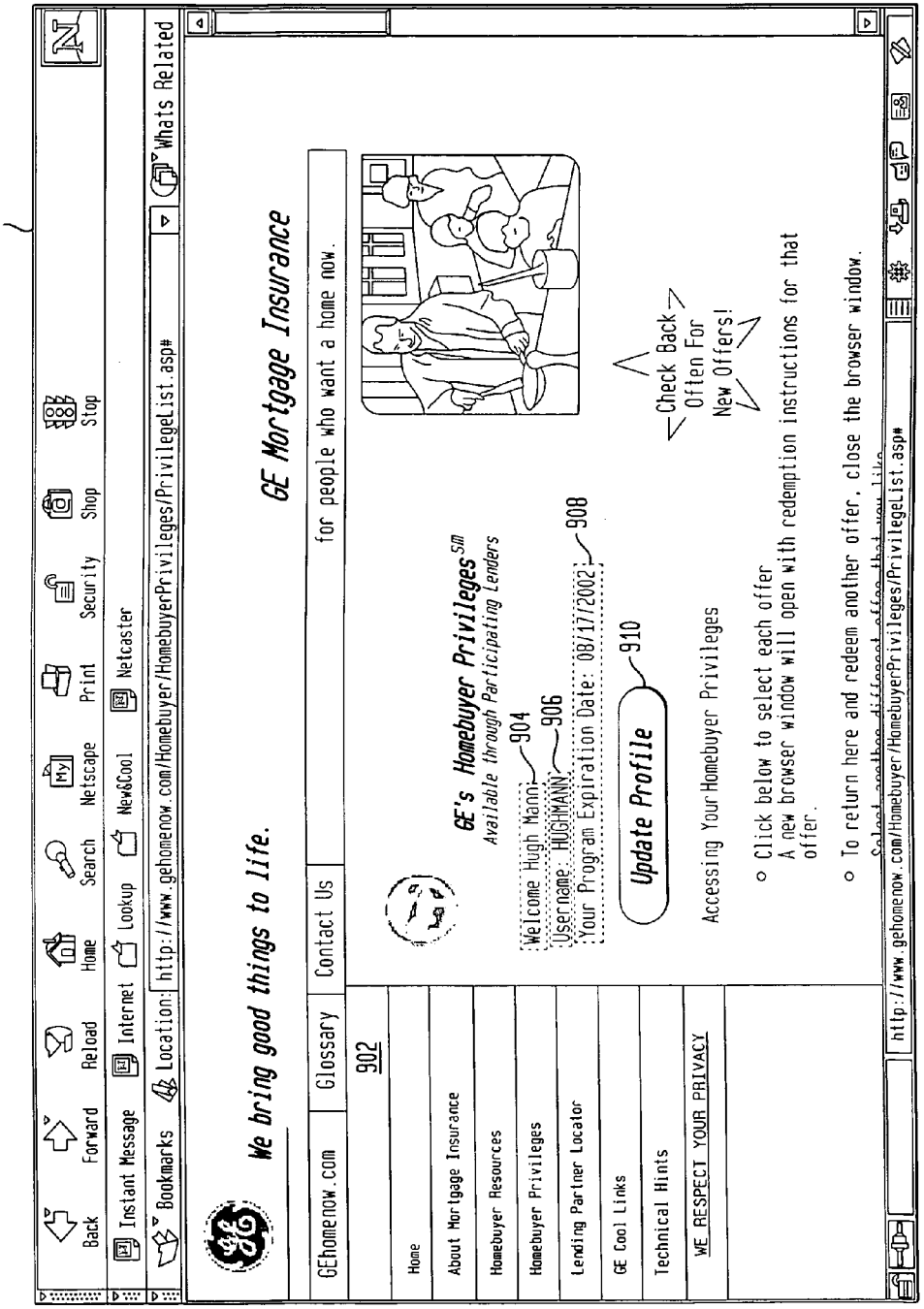
FIGS. 9A and 9B illustrate a web page displayed upon login to an offer presentation system according to an aspect of the present invention.

FIG. 9A illustrates the browser 402 displaying a login web page 902. The web page 902 is connected to and displayed after the borrower has clicked the link indicating acceptance of the privacy policy or has performed a new login subsequent to initial registration, using the username and password selected during registration. The web page 902 displays the borrower's name 904, username 906, and date of expiration of program membership 908, as well as a hypertext link 910 which can be selected in order to revise or update borrower information. The web page 902 also includes descriptions of, and hyperlinks for accessing, a number of special offers. Additional portions of the web page 902 can be seen in FIG. 9B below.

Figure 9B:
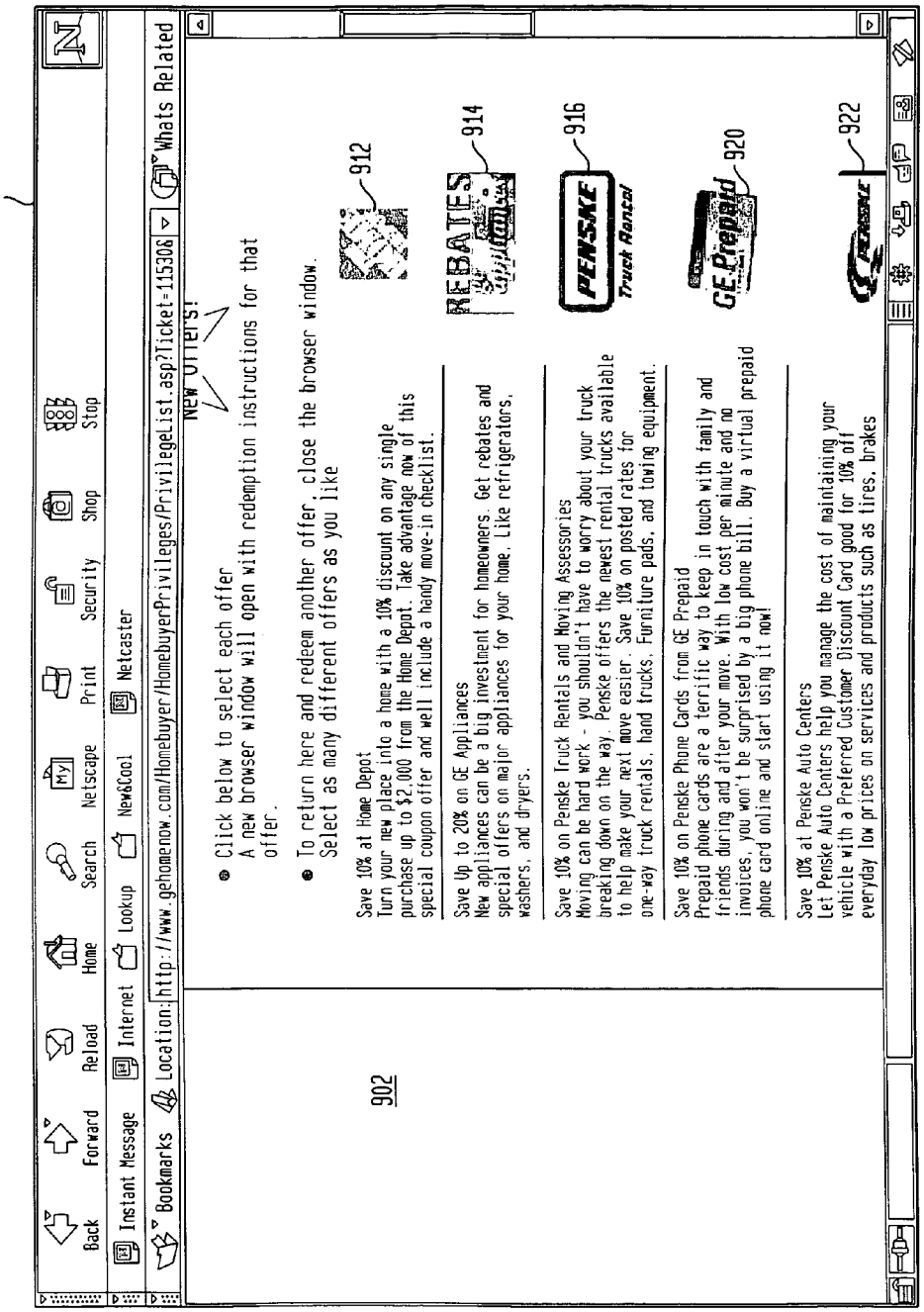

FIG. 9B illustrates the browser 402 displaying the web page 902 after the web page 902 has been scrolled down. Visible here are instructions for accessing offers, as well as hypertext links 912–922. Each of the links 912–922 is accompanied by promotional material describing the offer. The web page 902 includes additional offer descriptions and links, but these are not shown here in order to avoid redundancy.

Figure 10A:
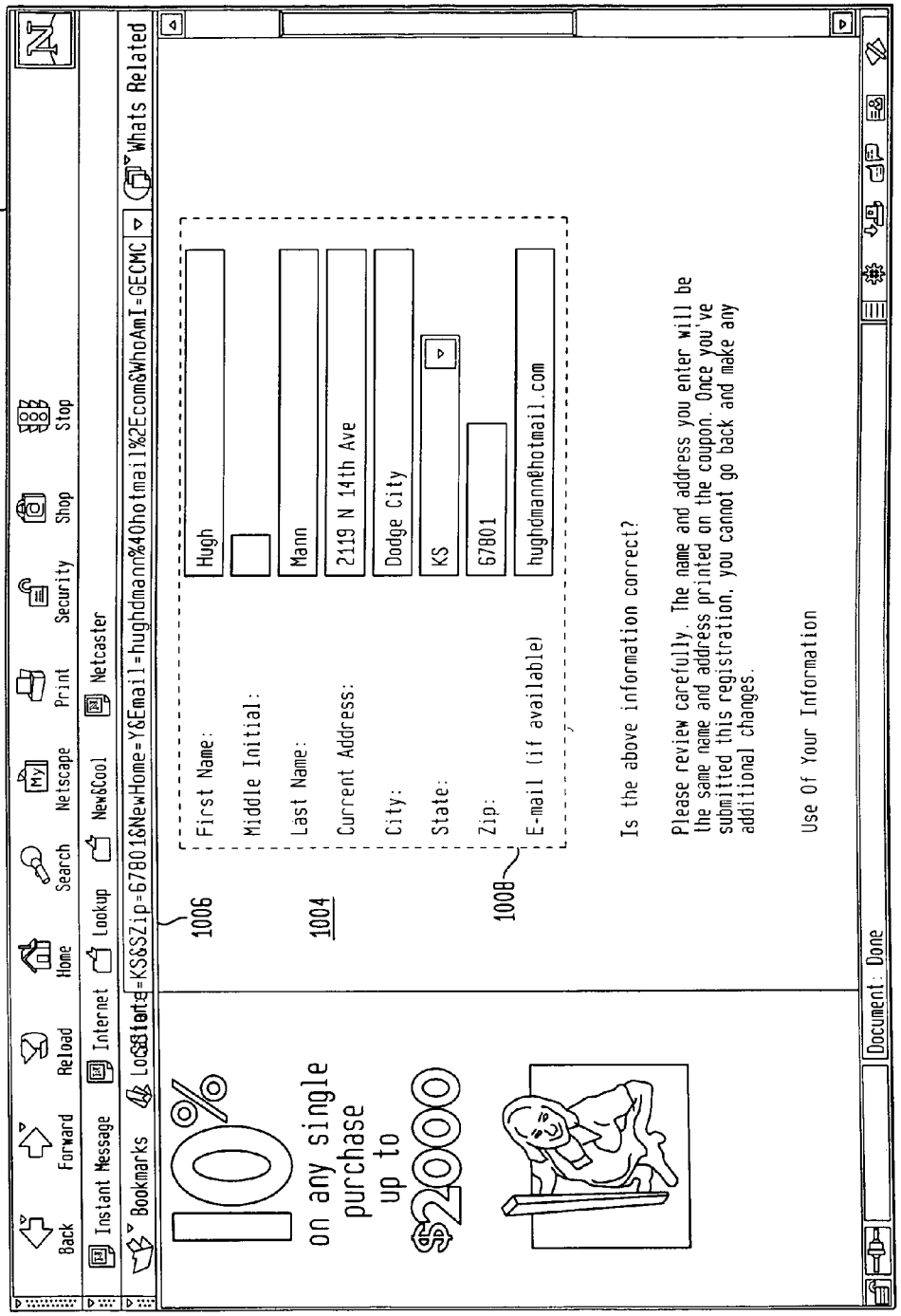
FIGS. 10A and 10B illustrate a web page reached after selecting an offer, the web page presenting a form to be submitted using an offer presentation system according to an aspect of the present invention.

FIG. 10A illustrates a new browser window 1002, displaying a web page 1004, reached when a borrower clicked on the link 912 shown in FIG. 9B. The web page is reached by providing the URL 1006 to the browser 1002.

It will be recognized that the URL includes the personal information provided during registration for the system 100. When the borrower clicks on a link to access an offer, the registration information is submitted to the vendor providing the offer. It will also be recognized that the URL 1006 includes the lender identifier provided at registration. Providing this information lets the vendor providing the offer know which lender introduced the borrower to the system. The vendor can use this information in developing relationships with lenders and their customers. For example, if many borrowers taking advantage of an offer were introduced by a particular lender, the vendor making that offer may find it advantageous to develop special marketing programs directed to borrowers from that lender. In addition, the vendor may collect and store personal information relating to borrowers who consent to this collection and storage by the vendor. As noted above, a consumer's use of the system 100 tends to identify him or her as a particularly desirable consumer for vendors who market products or services for consumers in his or her category, such as relocating consumers. The vendor's collection and storage of personal information relating to such consumers provides the vendor with a personal information database for a group of highly desirable consumers. This information may be used to develop mailing lists, for example, or for other marketing efforts targeting consumers for which personal information has been stored.

The web page 1004 allows the borrower to order a discount coupon by submitting an order form 1008. The order form 1008 is filled out using the registration information originally provided by the borrower and contained in the URL 1006, but the borrower is able to change the information contained in the order form 1008 as desired before submission.

Figure 10B:
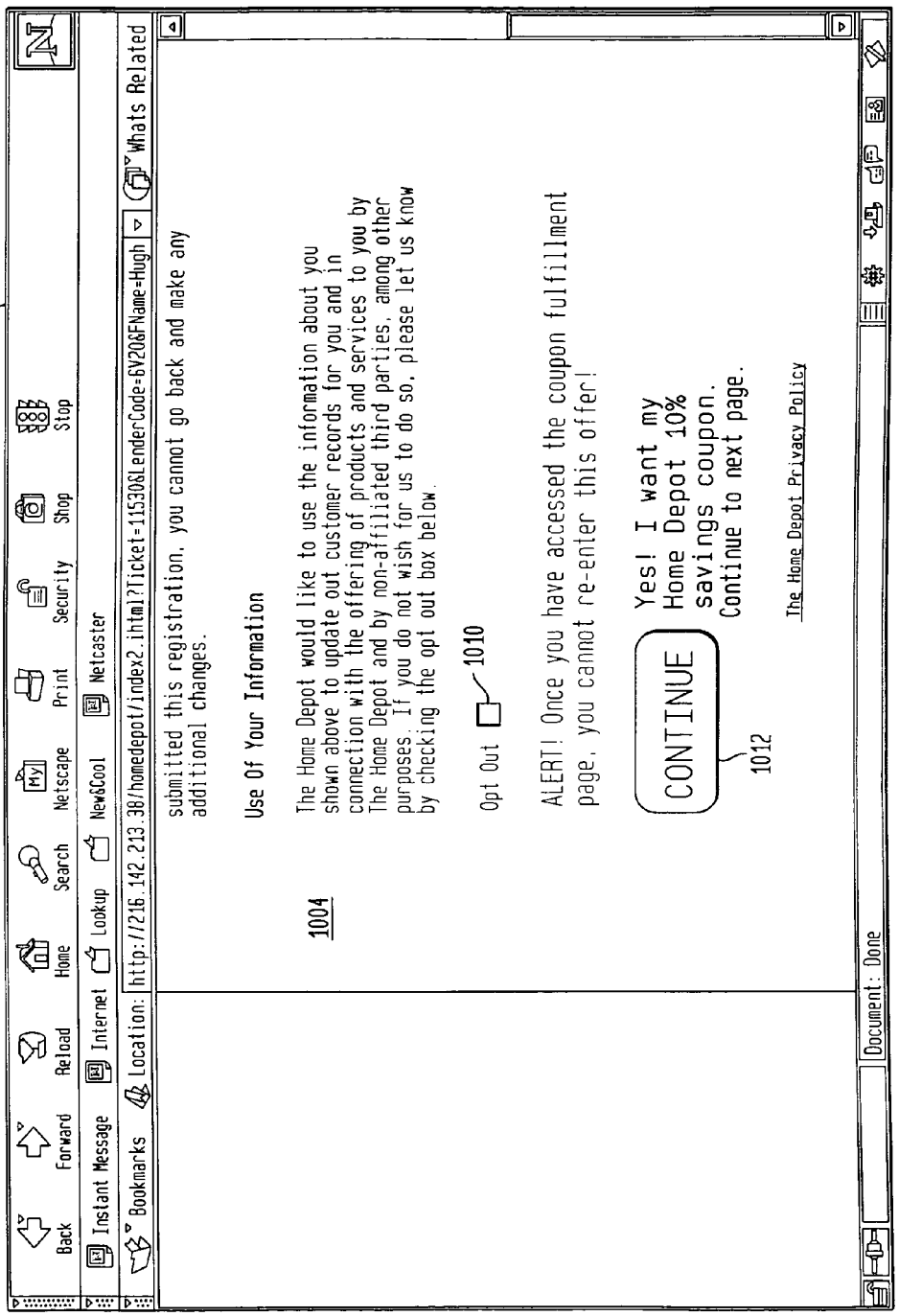

FIG. 10B illustrates the web page 1004 after the web page 1004 has been scrolled down. Additional instructions and explanatory material can be seen, as well as a check box 1010 allowing the borrower to choose whether or not to receive promotional material from the vendor, and a hypertext link 1012 allowing the borrower to submit the form 1008.

Figure 11A:
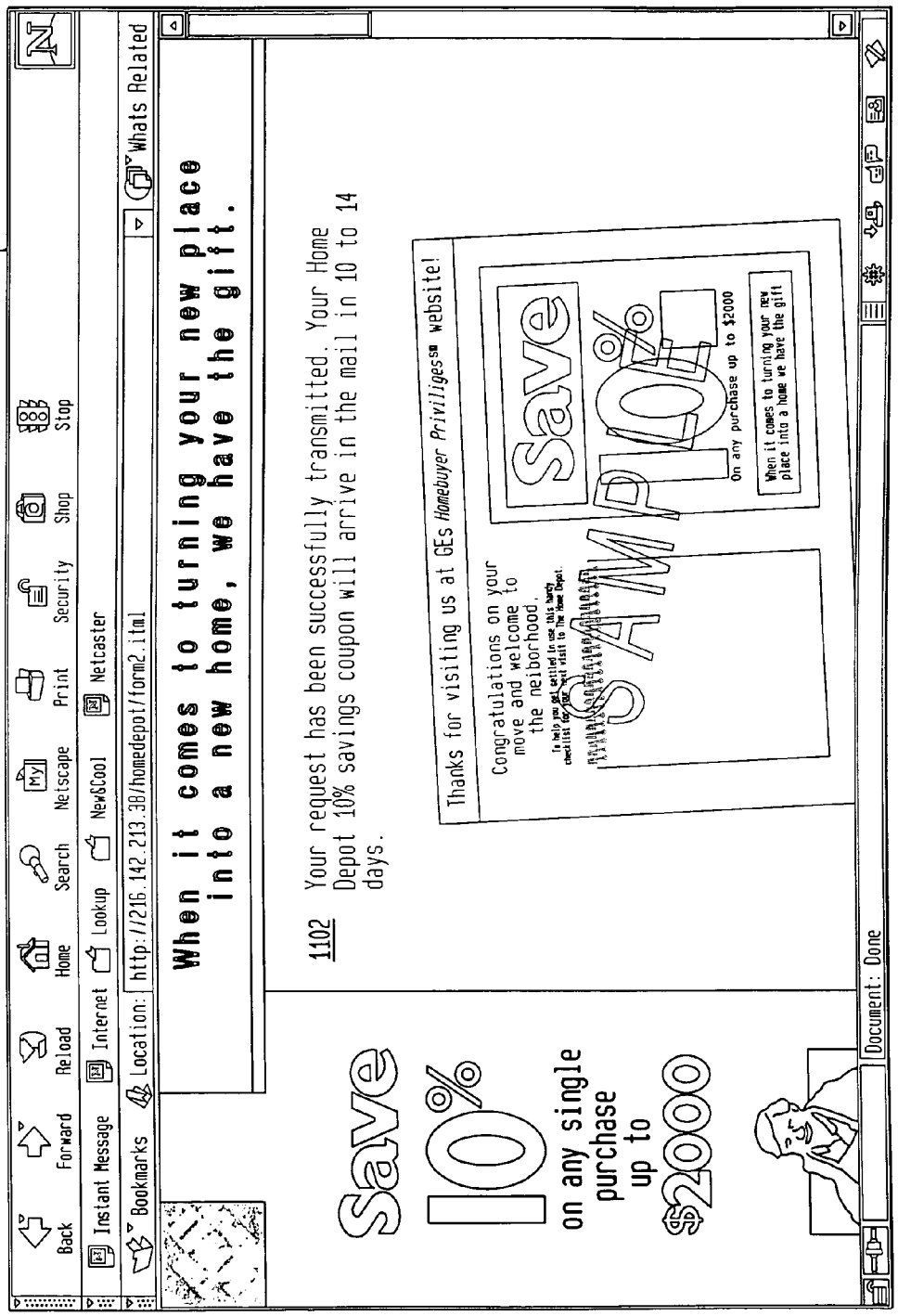
FIGS. 11A–11C illustrate a web page reached after submission of the form illustrated in FIGS. 10A and 10B.
Figure 11B:
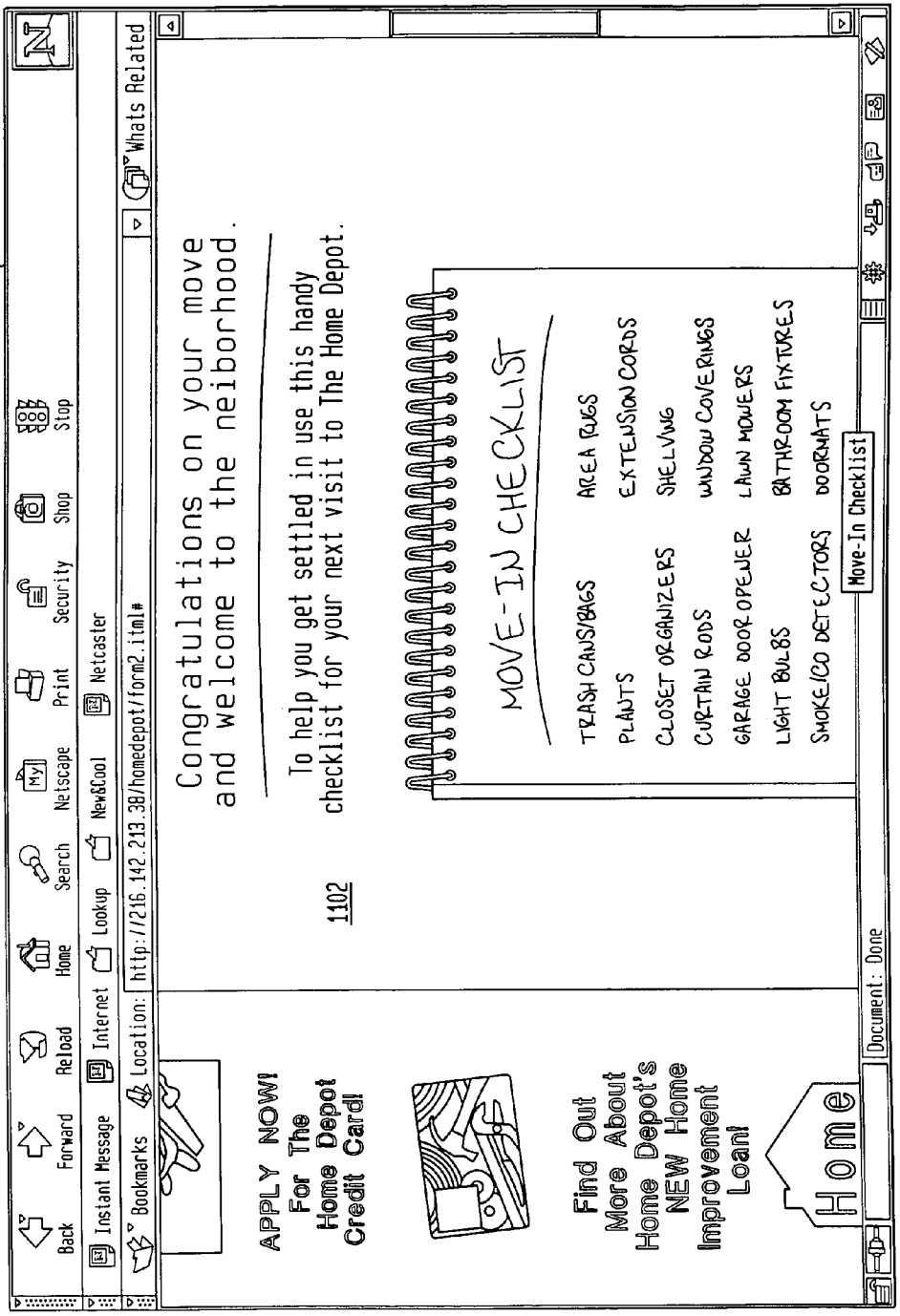
Figure 11C:
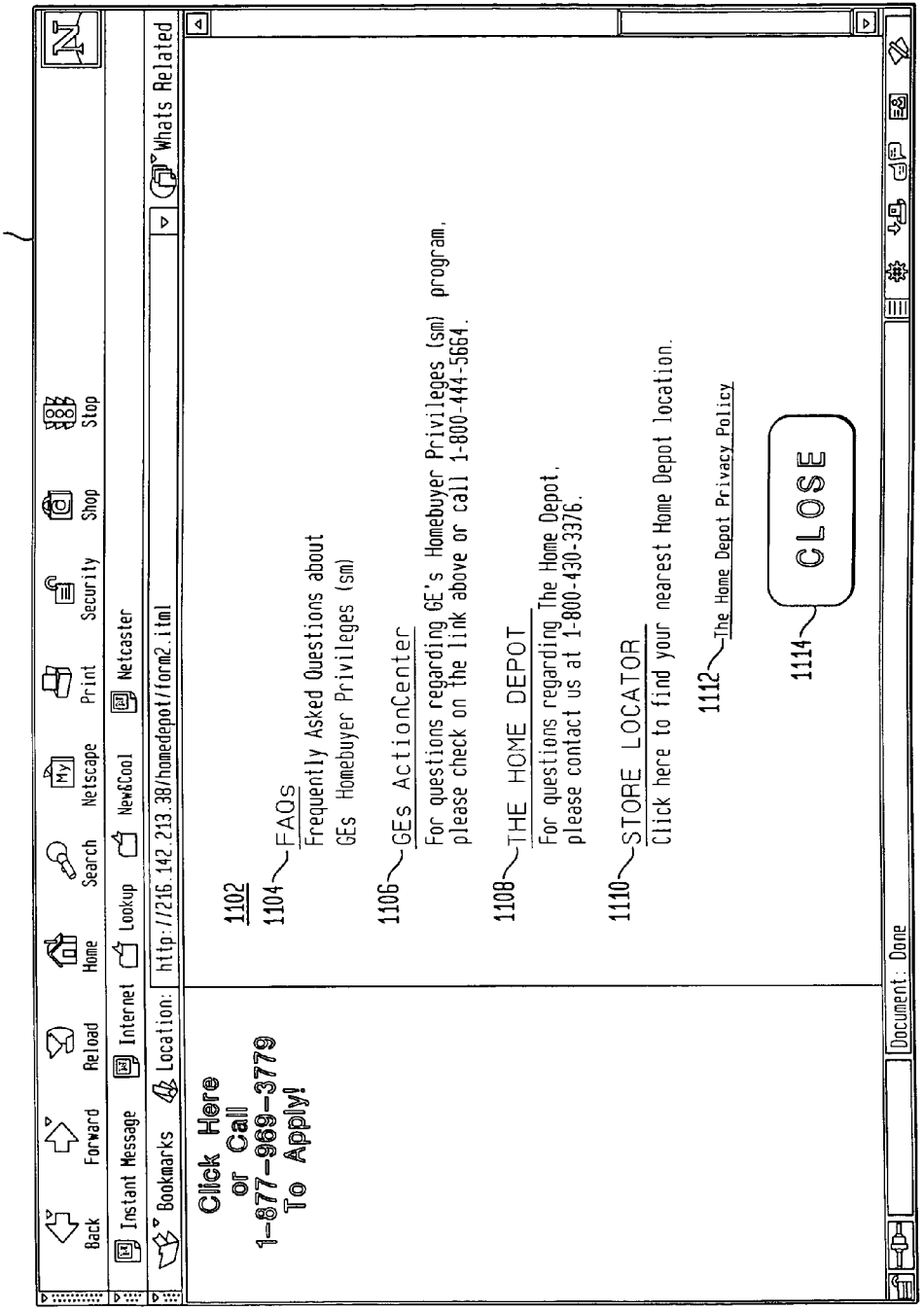

FIGS. 11A–11C show the browser 1002 displaying a web page 1102 reached after the borrower has clicked the link 1012. The web page 1102 displays various welcome and promotional messages, as well as a set of links 1104–1114 to allow the borrower to obtain further information or take further action.

Because each borrower can be identified with the lender who introduced him or her to the system, the set of offers to be presented can be designed so as to operate differently for customers of different lenders, in order to meet the needs of the lender. For example, in the system 100 of FIG. 1, the lender 110B may offer its borrowers a package of products or services and may not wish to provide offers for competing products or services to its borrowers. To take another example, the lender 110D may choose to subsidize an offer for its customers and may therefore desire that such an offer be provided only to borrowers who registered using the lender identifier provided by lender 110D. By arrangement with the service provider 104, the lender 110B can direct that borrowers who registered using its lender identifier be provided with an abbreviated set of offers, in order to avoid competing with goods or services offered by the lender 110B and the lender 110D can direct that borrowers who registered using the lender identifier provided by lender 110D will be provided with an offer not available to other borrowers. Selections of the offers which are to be made available and limitations or restrictions on which offers are going to be made available are typically the result of agreements between the service provider 104 and a lender such as the lender 110B or 110D. The individual lenders do not have exclusive power to control or change which offers will be made available to its borrowers.

Figure 12:
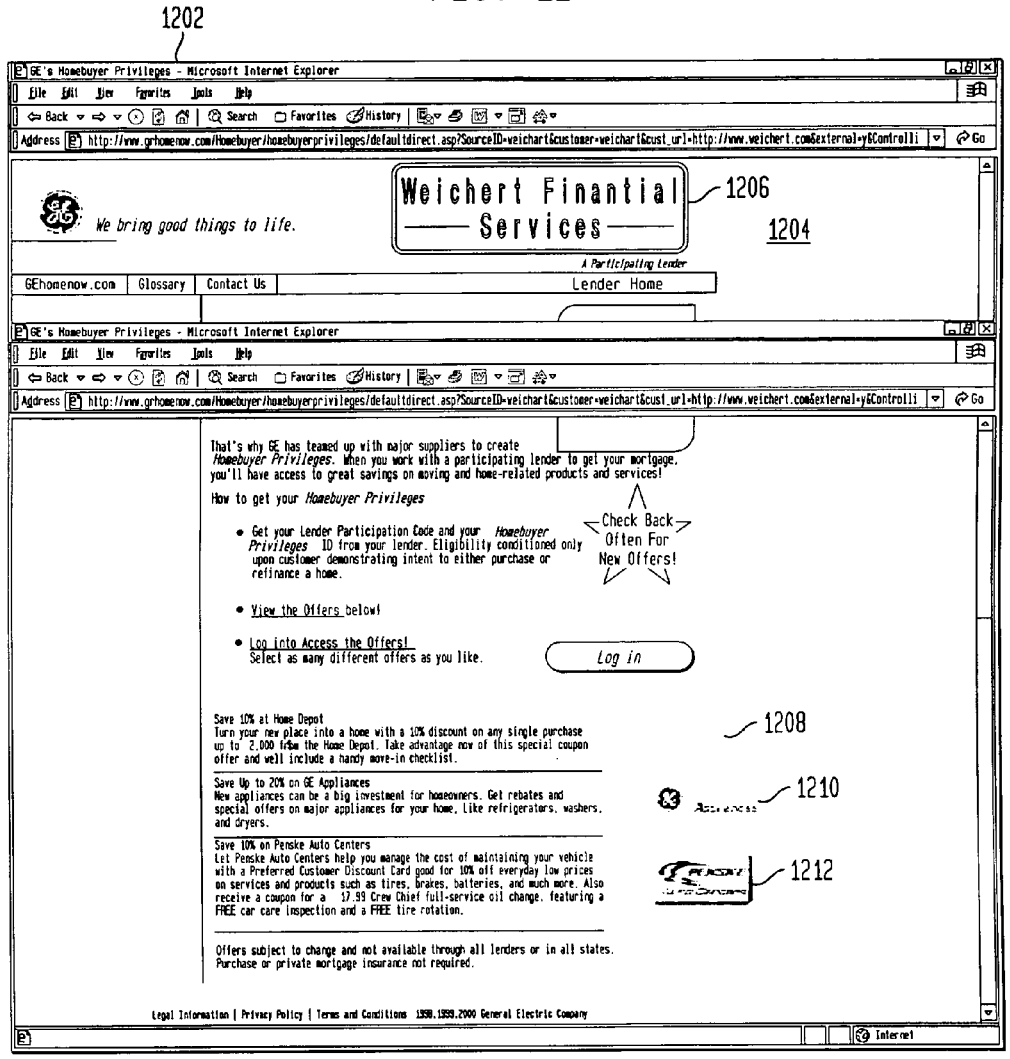
FIG. 12 illustrates a web page displaying a limited set of offers presented using a system according to an aspect of the present invention.

FIG. 12 illustrates a browser 1202 displaying a web page 1204, reached upon connecting to the server 102 using a hyperlink provided by a computer maintained by a lender who wishes to present a limited selection of offers. The web page 1204 displays a lender logo 1206 and a set of offers 1208–1212. The set of offers 1208–1212 is abbreviated compared, for example, to the set of offers displayed on the web page 802 above. When a borrower registers using a lender identifier previously provided by the lender who selected the offers to be presented, or logs in with a username and password generated upon registration using the lender identifier provided by the lender 110B, a login web page will be presented similar to the login web page 802, except that the web page 1204 will includes only the offers 1208–1212.

While the present invention is disclosed in the context of aspects of an embodiment employing a specific system and exemplary web pages, it will be recognized that a wide variety of implementations may be employed by persons of ordinary skill in the art consistent with the above discussion and the claims which follow below.

The invention claimed is:

1. An offer presentation system for identifying consumers as belonging to a designated category and allowing access to offers by consumers who are members of the designated category, comprising:
    a database of offers accessible through connection by consumer operated computers upon authentication of consumer registration;
    an offer presentation module for managing access to the database of offers; and
    a consumer registration module allowing registration of a consumer for access to the offer presentation module, the consumer registration module allowing registration of a consumer upon submission and authentication of identifying information provided to the consumer by a party who has verified the consumer's membership in the designated category and used to identify the consumer as belonging to the designated category, wherein the consumer registration module is hosted on a server and the server determines which offers are available to the consumer depending on the identifying information associated with the consumer.

2. The system of claim 1 wherein the consumer registration module allows the consumer to select a unique consumer username and a password after providing the identifying information.

3. The system of claim 2, wherein the consumer registration module solicits personal information from the consumer during registration, associates the personal information with the consumer username and stores the personal information in association with the consumer username during registration.

4. The system of claim 3, wherein the consumer registration module associates the consumer username with the identifying information and stores the identifying information in association with the consumer username during registration.

5. The system of claim 4, wherein the consumer registration module is hosted on the server is connected to the Internet and wherein the consumer gains access to the consumer registration module by activating a hypertext link to navigate to a web page serving as a portal to the consumer registration module.

6. The system of claim 5, wherein the database of offers includes a hypertext link for each offer and wherein the consumer can activate the hypertext link for an offer in order to access the offer.

7. The system of claim 6, wherein one or more offers is accessible only if predetermined conditions have been met.

8. The system of claim 7, wherein activating a hypertext link for an offer causes the transmission of the identifying information, the consumer username and the consumer personal information to a server hosting the offer.

9. The system of claim 8, wherein the consumer username and personal information is examined to determine if the consumer meets any predetermined conditions established for access to the offer.

10. The system of claim 9, wherein the server hosting the offer is able to retain the consumer personal information for use in future marketing efforts.

11. The system of claim 1, wherein the party identifying the consumer as belonging to the designated category is a lender and wherein the identifying information is provided to the consumer when the consumer has applied for home financing with the lender.

12. The system of claim 1, wherein the party identifying the consumer as belonging to the designated category is a lender and wherein the identifying information is provided to the consumer when the lender has judged that the consumer is a serious prospect to apply for home financing with the lender.

13. A method for presenting offers to consumers who are members of a designated category, comprising the steps of:
    providing a consumer with an identifier upon verification of the consumer's membership in the designated category by a party providing the identifier;

receiving in a computer based system the identifier when presented by the consumer;

authenticating the identifier by the computer based system;

upon authentication of the identifier, allowing the consumer to register his identity with the computer based system; and upon completion of registration, allowing the consumer to utilize the computer based system to access a selection of offers, wherein the computer determines which offers are available to the consumer depending on the identifier associated with the consumer.

14. The method of claim 13, wherein the step of receiving the identifier includes establishing a connection to a consumer computer upon a request by the consumer, presenting an initial login form for display on the consumer computer, the form including one or more fields for input of the identifier by the consumer, and receiving submission of identifying information in the computer based system.

15. The method of claim 14, wherein the step of allowing the consumer to register his or her identity includes presenting a registration form for display on the consumer computer, the form including one or more fields for entry by the consumer of registration information including a consumer username and password selected by the consumer as well as for consumer personal information, receiving submission of the consumer username, password and consumer personal information and storing the consumer username, password and personal information in association with the identifier.

16. The method of claim 15, wherein the connection to the consumer computer is established over the Internet.

17. The method of claim 16, wherein the initial login form is a web page including a hypertext link for submission of the identifying information and the registration form is a web pages including a hypertext link for submission of the registration information.

18. The method of claim 17, wherein the step of registering the identify of the consumer is followed by the step of presenting a login form to the consumer, the login form including one or more hyperlinks which can be activated by the consumer in order to gain access to offers.

19. The method of claim 18, wherein the step of allowing the consumer access to the selection of offers includes presenting a selection of offer descriptions to the consumer, each offer description being accompanied by a hyperlink which can be activated by the consumer in order to retrieve additional information and offer materials.

* * * * *